United States Patent [19]
Williams et al.

[11] 3,940,580
[45] Feb. 24, 1976

[54] STARTER SWITCH FOR ENGINE RESPONSIVE TO VARIOUS TRANSMISSION OPERATIONAL STATES

[75] Inventors: Richard D. Williams, Fairport; Fred G. Michaels, Pittsford, both of N.Y.

[73] Assignee: General Motors Corporation, Detroit, Mich.

[22] Filed: Aug. 19, 1974

[21] Appl. No.: 498,756

Related U.S. Application Data
[62] Division of Ser. No. 325,325, Jan. 23, 1973, Pat. No. 3,844,180.

[52] U.S. Cl............................. 200/61.85; 200/61.88
[51] Int. Cl.² .......................................... H01H 9/06
[58] Field of Search............. 200/4, 11 R, 14, 17 R, 200/61.85–61.91, 153 J, 238, 239, 243, 250, 327, 328, 329, 330, 336, 340, 11 C

[56] References Cited
UNITED STATES PATENTS
| | | | |
|---|---|---|---|
| 3,024,335 | 3/1962 | Mitchell et al.................. | 200/250 X |
| 3,227,817 | 1/1966 | Ogren ..................... | 200/4 |
| 3,857,059 | 12/1974 | Larson.................. | 200/4 X |

Primary Examiner—James R. Scott
Attorney, Agent, or Firm—John P. Moran

[57] ABSTRACT

The control mechanism described herein includes an instrument panel-mounted shift control knob assembly which serves to selectively rotate a pulley and belt arrangement to thereby move a pivotally mounted bellcrank lever connected to the belt and to which a transmission shift control cable is operatively attached. Associated with the control knob assembly and with an adjacent lock mechanism is a series of linkage members which serve to concurrently lock the steering wheel and the parking brake in response to the positioning of an ignition key in the "Lock" position in the lock mechanism only after the control knob is manually placed in the "Park" position and the parking brake is manually applied. Additionally, a starter switch is associated with the control mechanism whereby the switch may be operated only in the Park or Neutral positions.

2 Claims, 10 Drawing Figures

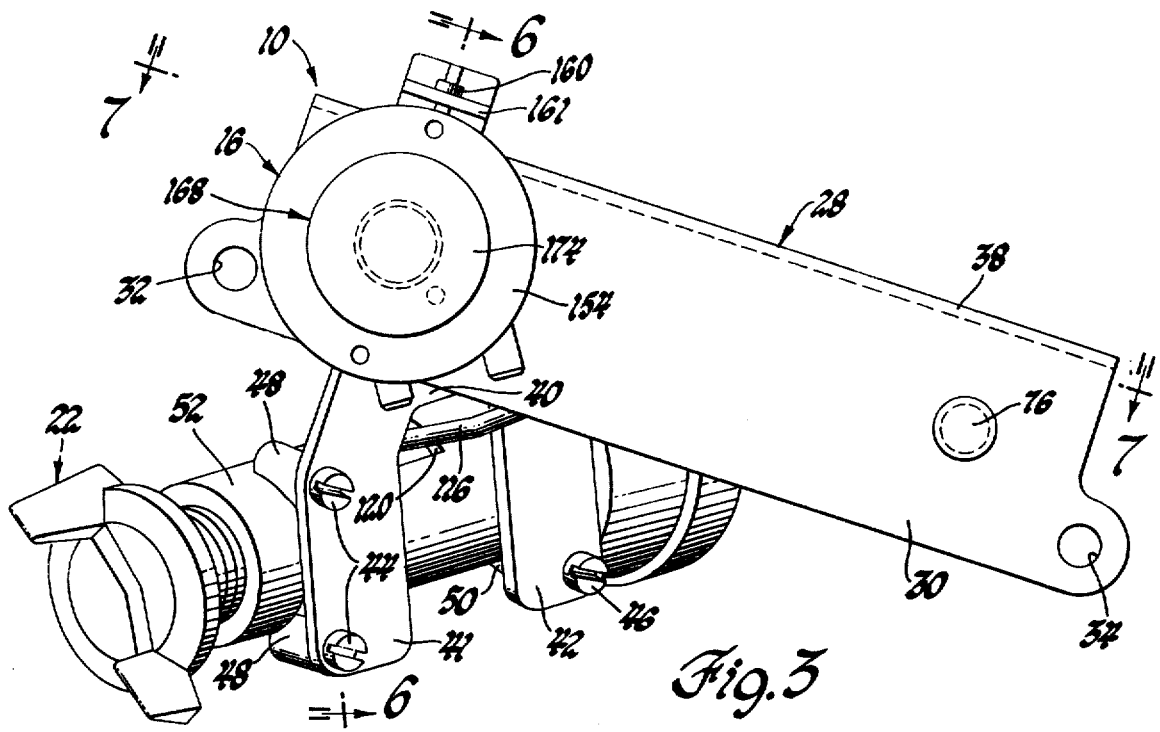
Fig. 3
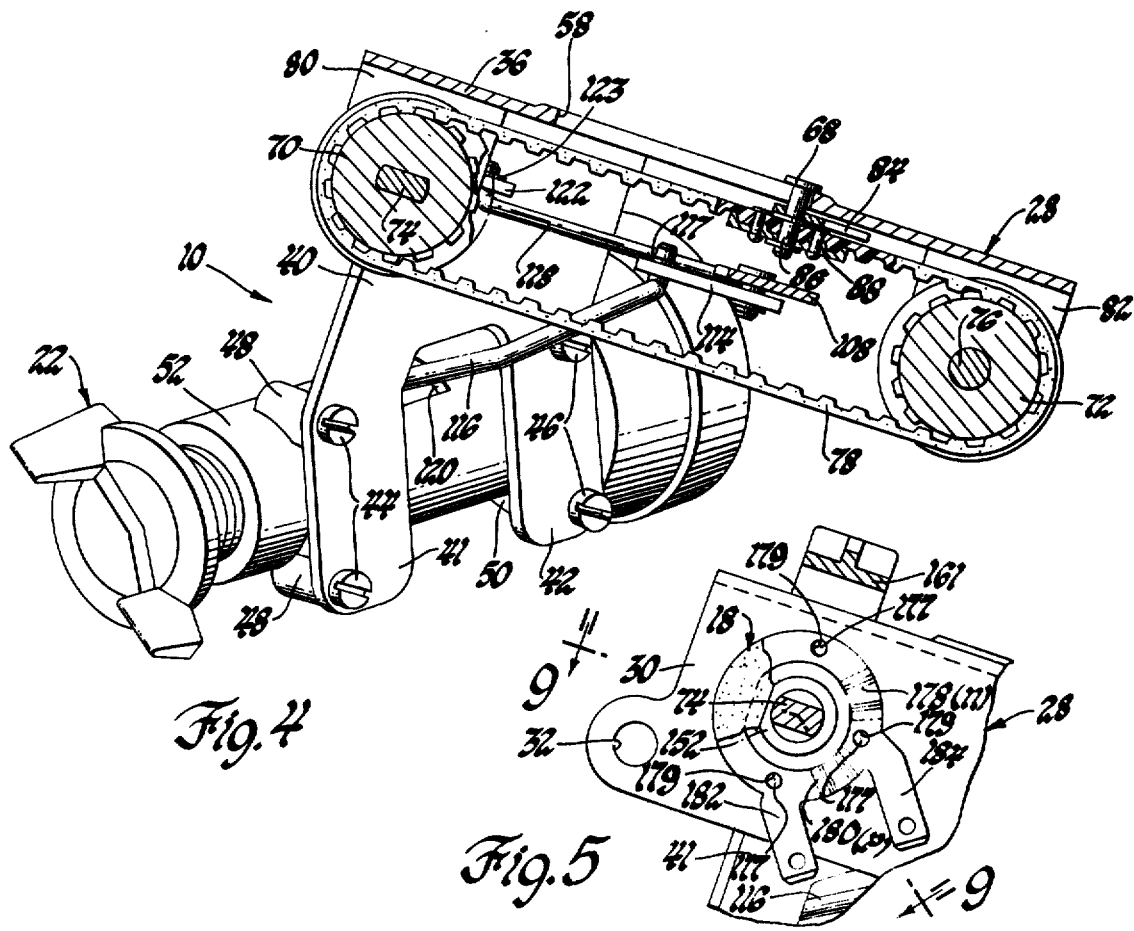
Fig. 4
Fig. 5

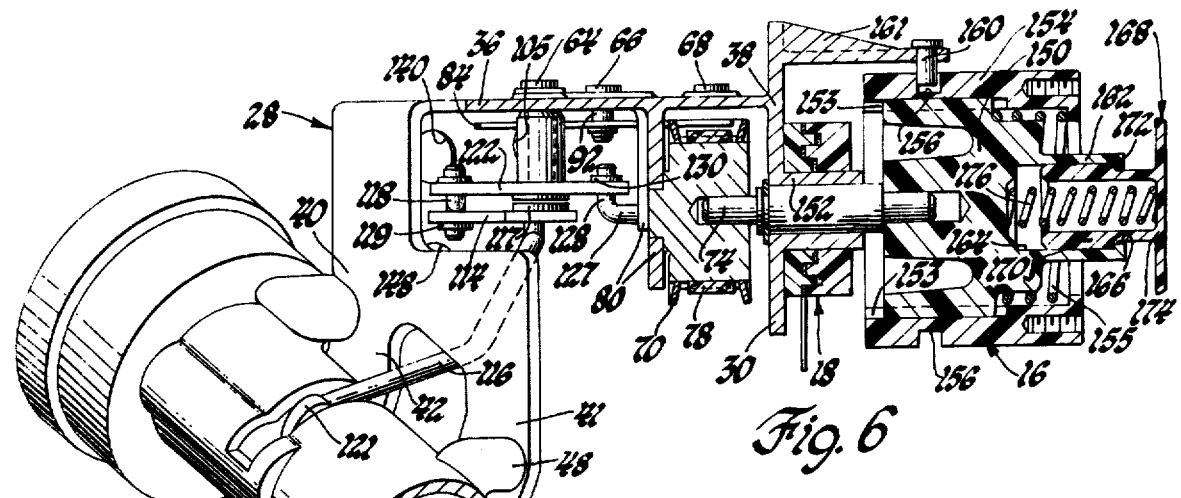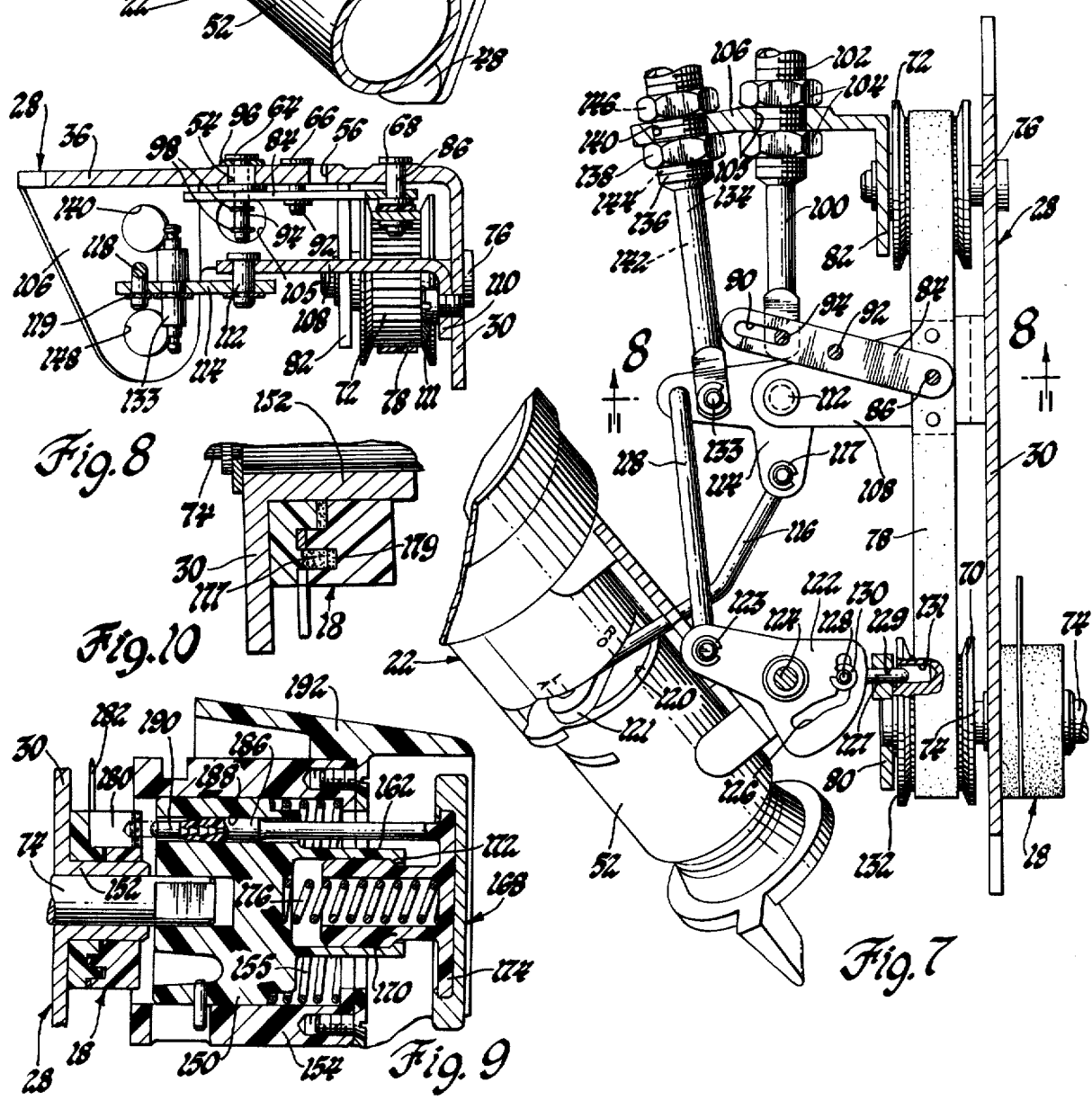

STARTER SWITCH FOR ENGINE RESPONSIVE TO VARIOUS TRANSMISSION OPERATIONAL STATES

This a division of U.S. application Ser. No. 325,325, filed Jan. 23, 1973, now U.S. Pat. No. 3,844,180 dated Oct. 29, 1974.

This invention relates generally to automotive control mechanisms and, more particularly, to an instrument panel-mounted cable-actuating type.

An object of the invention is to provide an improved automotive instrument panel-mounted control mechanism suitable for performing variety of functions.

Another object of the invention is to provide an instrument panel-mounted control mechanism having a rotary control knob assembly for actuating selected transmission drive ratios, and a cooperating lock and linkage mechanism for locking the steering wheel and parking brake and permitting ignition key removal when the control knob is in the "Park" position and the parking brake is manually applied.

A further object of the invention is to provide a control mechanism including a rotary control knob type transmission control arrangement for rotating a flexible belt and pulley and associated bellcrank lever assembly through six (6) selected positions to produce five (5) transmission drive ratios, namely, Reverse [R], Neutral [N], Drive [D], and two Low [S] and [L], via an interconnecting cable.

Still another object of the invention is to provide such a rotary control knob and pulley arrangement which is adaptable to having an additional linkage system operatively connected thereto for locking the steering wheel and parking brake automatically upon the manual positioning of an ignition key in the "Lock" position after the control knob has been manually rotated into the "Park" position and the parking brake has been manually applied.

A still further object of the invention is to provide an instrument panel-mounted control mechanism wherein a rotary control knob serves to rotate a toothed pulley and an associated toothed flexible belt, to thereby move a pivotally mounted bellcrank lever which is pivotally secured at one end thereof to the belt and to the other end of which a transmission control cable is pivotally attached, with the further provision of a lock mechanism and a first linkage member extending therefrom to a first pivotally mounted plate member which is both operatively connected to a second pivotally mounted plate via a second linkage member, and directly pivotally connected to cables leading to the steering wheel and the parking brake, there being an additional linkage member pivotally connected to the second plate member and operable to engage the toothed pulley to prevent rotation thereof once the rotary control knob is placed in the "Park" position and in response to rotating the ignition key in the "Lock" position in the Lock mechanism.

These and other objects and advantages of the invention will be apparent when reference is made to the following description and accompanying drawings, wherein:

FIG. 3 is an end view taken along the plane of line 3—3 of FIG. 2, and looking in the direction of the arrows;

FIG. 4 is a cross-sectional view taken along the plane of line 4—4 of FIG. 2, and looking in the direction of the arrows;

FIG. 5 is a fragmentary cross-sectional view taken along the plane of line 5—5 of FIG. 2, and looking in the direction of the arrows;

FIG. 6 is a cross-sectional view taken along the plane of line 6—6 of FIG. 3, and looking in the direction of the arrows;

FIG. 7 is a cross-sectional view taken along the plane of line 7—7 of FIG. 3, and looking in the direction of the arrows;

FIG. 8 is a cross-sectional view taken along the plane of line 8—8 of FIG. 7, and looking in the direction of the arrows; and FIG. 9 is an enlarged cross-sectional view taken along the plane of line 9—9 of FIG. 5, and looking in the direction of the arrows;

FIG. 10 is a fragmentary enlargement of a portion of the FIG. 6 structure.

Figure 1:
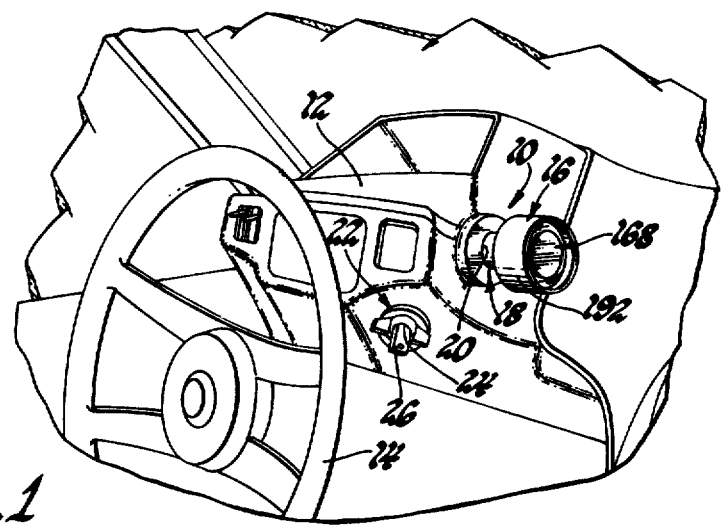
FIG. 1 is a perspective view of a vehicular instrument panel illustrating the inventive control mechanism mounted therein.

Referring now to the drawings in greater detail, FIG. 1 illustrates a control mechanism 10 mounted on an instrument panel 12 of an automotive vehicle, in the vicinity of the steering wheel 14. The control mechanism 10 includes a control knob assembly 16 rotatably mounted adjacent a starter switch 18 extending through an opening 20 formed in the instrument panel 12. A lock mechanism 22, including a key slot 24, is also mounted on the instrument panel 12, adjacent the control knob 16 but at a predetermined angle with respect thereto. A key 26 is insertable into the key slot 24.

Figure 2:
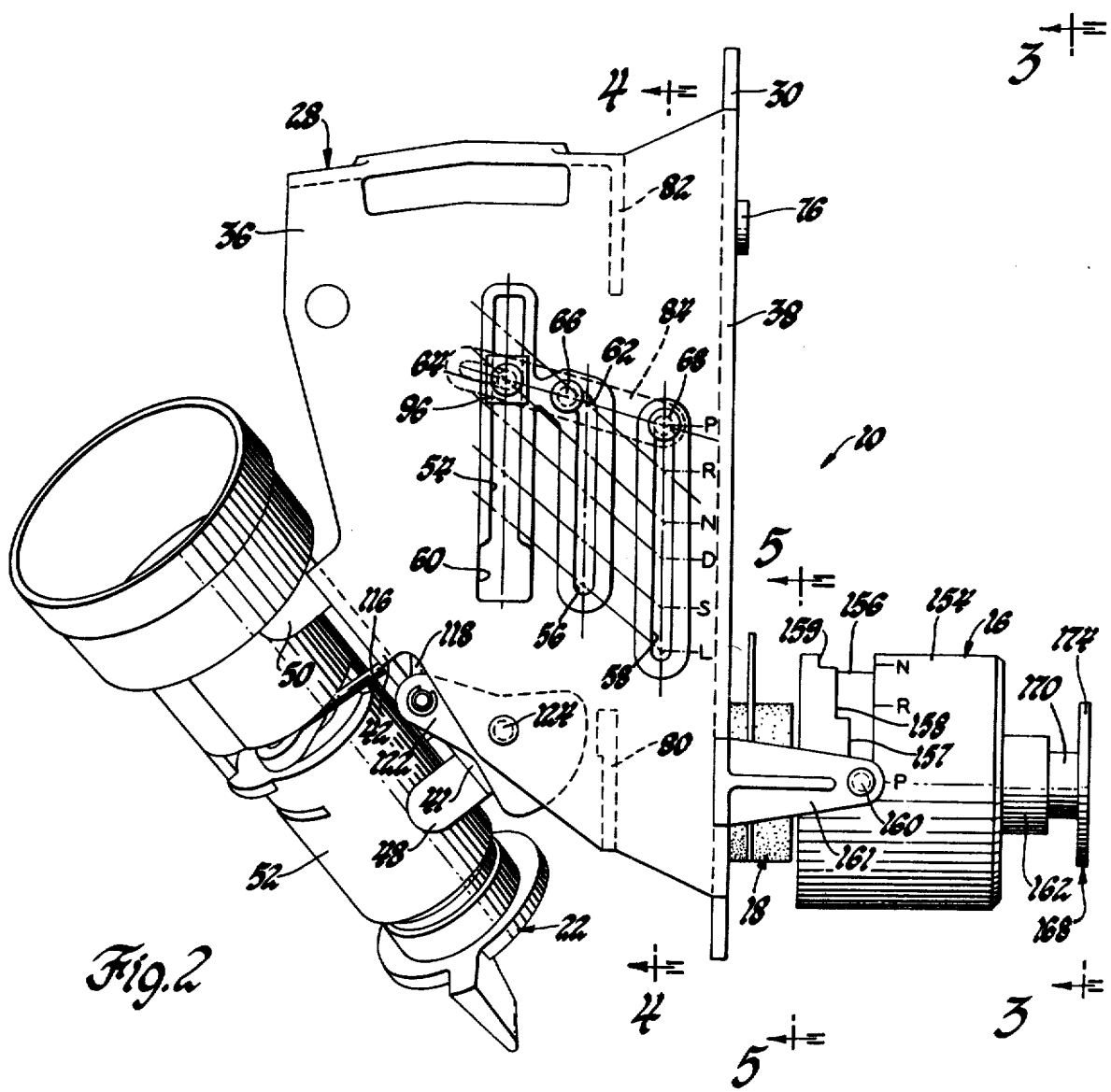
FIG. 2 is a top view of a control mechanism embodying the invention.

As may be noted in FIGS. 2 and 3, the control mechanism 10 and the lock mechanism 22 are rigidly secured with respect to one another by an interconnected bracket assembly 28. The assembly 28 includes a first flat plate member 30 (FIG. 3) whose plane is positioned perpendicular to the axis of the control knob 16 and which includes a pair of end openings 32 and 34 providing means for mounting the plate member 30 to the engine side of the instrument panel 12. A second flat plate member 36 (FIG. 2) is formed along an edge 38 of the first plate member 30, extending perpendicularly from the plane of the latter. A third flat plate member 40 including a pair of leg-like extensions 41 and 42 (FIG. 3) is formed along an edge of the plate member 36, perpendicular to the plane thereof, and serves as a base for the mounting thereon of the lock mechanism 22. This is accomplished by extending two pairs of bolts 44 and 46 through openings formed in the respective extensions 41 and 42 and, thence, threadedly attaching the bolts to two pairs of bosses 48 and 50 formed on the outer casing 52 of the lock mechanism 22.

As shown in FIG. 2, three parallel slots 54, 56, and 58 are formed in the plate member 36, the slot 54 having an enlarged opening 60 formed on one end thereof for assembly purposes, and the slot 56 having a short transverse or off-set slot 62 formed adjacent one end thereof opposite the opening 60. Three retainer flanges 64, 66, and 68, each larger in diameter than the width of the respective slots 54, 56, and 58, are slidably mounted on the plate member 36 adjacent such respective slots.

As may be noted in FIGS. 4, 6, 7, and 8, a pair of toothed pulleys 70 and 72 are rotatably mounted on respective shafts 74 and 76 extending through the plate member 30 and operatively interconnected by an endless toothed flexible belt 78. The pulleys 70 and 72 are axially retained adjacent the plate member 30 by respective wall members 80 and 82 formed on the plate member 36 and extending therefrom parallel to the plate member 30.

A linkage member of bellcrank lever 84 (FIG. 7) is pivotally connected at one end thereof by a pivot pin member 86 and suitable clamp 88 (FIG. 4) to the outer surface of the belt 78, with lost-motion means in the form of a slot 90 (FIG. 7) formed in the other end of the bellcrank lever 84. The pivot pin member 86 also extends through the slot 58, and it is the retainer flange 68 which retains the pivot pin member 86 for slidable movement in the slot 58. A second pivot pin member 92 (FIG. 7) is formed on and extends from the bellcrank lever 84 at an intermediate point therealong, the retainer flange 66 (FIG. 2) serving to retain the pivot pin member 92 for slidable movement in the interconnected slots 56 and 62 (FIG. 4). Still a third pivot pin member 94 (FIG. 7) extends through the slot 90 formed in the bellcrank lever 84, and, thence, through the slot 54 (FIG. 2) formed in the plate member 36. The pivot pin member 94 is retained for slidable movement in the slot 54 by the retainer flange 64 and a washer member 96, the latter being slidably mountable adjacent the slot 54 through the enlarged end opening 60 of the slot 54.

Adjacent the end of the pivot pin member 94 opposite the retainer flange 64 are formed a pair of spaced collars 98 (FIG. 8), between which is secured the end of a transmission cable 100 (FIG. 7), the latter cable 100 extending from the pivot pin member 94 through a sheave 102 secured by nuts 104 in an opening 105 formed in a wall member 106 formed along an edge of the plate member 36.

A support plate member 108 (FIGS. 7 and 8) extends parallel to the bellcrank lever 84 and includes a flange 110 (FIG. 8) secured to the bracket assembly plate member 30 by a bolt 111. A pivot pin 112 extends between the support plate member 108 and an adjacent parallel plate member 114 for pivotally supporting the latter. A pair of linkage rods 116 and 118 (FIG. 7) are pivotally mounted at predetermined points on the plate member 114 and secured thereon by retainer rings 117 (FIG. 7) and 119 (FIG. 8), respectively. The linkage rod 116 extends through the opening between the extensions 41 and 42 of the plate member 40 and through a slotted opening 120 formed on the outer casing 52 of the lock mechanism 22 to pivotally connect to a member 121 (FIG. 7) mounted therein and rotatably controlled by the key 26. As may be realized from FIG. 7, the member 121 is rotatable by the key 26 into four (4) positions, namely, Lock [L], Accessory [A], Off [O], and Run [R]. The key 26 is removable from the lock mechanism 22 only when in the Lock [L] position.

The linkage rod 118 extends to still another plate member 122 and is pivotally secured thereon by a retainer ring 123. The plate member 122 is pivotally mounted on a centrally located pivot pin 124 secured to the plate member 36 (FIG. 2). An arcuate or curved cam slot 126 is formed in the plate member 122 on the side thereof opposite the linkage rod 118 connection, the pivot pin 124 being located in the center thereof. The cam slot 126 is positioned around a pin member 128 for slidable movement thereon. The pin member 128 includes a bent center portion 127 (FIG. 6) and is retained aligned with the pivot pin 124 by virtue of extending through an opening 129 (FIG. 7) formed in the fixed wall member 80. One end of the pin member 128 is thus retained in the slot 126 by a retainer clip 130, while the other end thereof is at times insertable into an opening 131 (FIG. 7) formed in the adjacent face 132 of the pulley 70, as will be explained.

Referring once again to the plate member 114 of FIGS. 6–8, it may be noted that a pin member 133 is mounted thereon and extends from both sides thereof (FIG. 8). A brake cable 134 (FIG. 7) extends from one end of the pin member 133 through a sheave 136 secured by nuts 138 in an opening 140 formed in the wall member 106, while a steering cable 142 (FIG. 7) extends from the other end of the pin member 133 through a second sheave 144 secured by nuts 146 in an opening 148 (FIG. 8) also formed in the wall member 106.

As may be noted in FIG. 6, the control knob 16 includes an inner cylindrical member 150 formed of a suitable insulating material and press-fitted on the shaft 74 on the end thereof opposite the toothed pulley 70, the shaft 74 being supported on the plate member 30 by virtue of extending through a cylindrical hub member 152 formed on the plate member 30. An outer casing 154, which is also formed of a suitable insulating material is axially slidably mounted on the inner cylindrical member 150 by means of intermeshed splines 153. A spring 155 is mounted between the inner member 150 and the outer casing 154, urging the casing 154 away from the inner member 150. An arcuate opening 156 (FIG. 2) is formed a predetermined distance around the outer casing 154, providing progressively stepped parallel side walls 157, 158, and 159 along one edge thereof. A pin member 160 is mounted on a bracket 161 which is formed on and extends from the interconnecting edge 38 between the plate members 30 and 36, the pin member 160 extending into the arcuate opening 156 and being urged against the adjacent side wall 157, 158, or 159 by the spring 155.

A hub member 162 is formed on the outer end of the cylindrical member 150. A pocket 164 is formed on the hub member 162. An inwardly extending collar 166 is formed adjacent the end of the hub member 162. A starter button assembly 168 includes a sleeve member 170 formed of a suitable insulating material and slidably mounted within the pocket 164 and having a circumferential shoulder 172 formed on the outer periphery thereof. A button 174 is integrally molded on the exposed end of the sleeve member 170, and a spring 176 is mounted in the sleeve member 170 between the inner surface of the starter button 174 and the bottom of the pocket 164, urging the shoulder 172 into contact with the collar 166 providing a predetermined clearance between the inner end of the sleeve member 170 and the bottom of the pocket 164.

As shown in FIG. 6, the starter switch 18 is formed in two halves (FIG. 2) located circumferentially by projections 177 and receiving apertures 179 (FIGS. 9 and 10), and mounted around the hub member 152 and includes two sets of contacts 178 and 180 (FIG. 5) positioned at predetermined locations therearound. A pair of terminals 182 and 184 extend outwardly from the starter switch 18. Referring now to FIG. 9, it may be noted that a rod-like member 186 is formed on the starter button 174, extending therefrom and being slidably mounted through a longitudinal passage 188 formed through the inner cylindrical member 150 parallel to the axis of the pocket 164. It may be further noted that, as the button 174 is depressed against the force of the spring 176, thereby moving the sleeve member 170 toward the bottom of the pocket 164, a metal end 190 formed on the member 186 may be projected into one of the sets of contacts 178 or 180, provided either of the latter is properly aligned therewith, as illustrated by the phantom line shown in FIG. 9. The precise circumferential locations of the contacts 178 and 180 are such that the end 190 may enter respectively therein only when the control knob assembly 16 is positioned in the Neutral [N] or Park [P] position, respectively. Hence, start-up may occur only in the latter conditions.

As may be realized from FIG. 2, the conventional indicia P-R-N-D-S-L are formed on the outer casing 154 of the control knob 16, such indicia corresponding to five (5) transmission drive ratio positions of the transmission cable 100 resulting from the movement of the pivot pin member 86 (FIG. 7) in the slot 58 (FIG. 2) formed in the plate member 36, the six (6) drive ratios being well known as Park [P], Reverse [R], Neutral [N], Drive [D], and two Lows [S] and [L]. If desired, a housing member 192 (FIGS. 1 and 9) may be formed of a suitable insulating material and mounted on the outer casing 154 to cover the starter button assembly 168.

In operation, from FIGS. 3, 4, 6, and 7, it is apparent that as the housing member 192 or the control knob outer casing 154 is manually rotated, the inner cylindrical member 150, the shaft 74, the pulley 70, and the flexible belt 78 are correspondingly rotated to thereby cause the bellcrank lever 84, through the pivot pin member 86, to slide the pivot pin 92 along the slot 56, thus sliding the pivot pin member 94 along the slot 54, initiating movement of the cable 100 leading to the transmission shift lever (not shown).

As may be noted from FIG. 2, the slots 56 and 54 formed in the plate member 36 appropriately position the respective pivot pin members 92 and 94, in response to the sliding movement of the pivot pin member 86 in the slot 58, so as to produce the desired transmission drive ratio through the transmission cable 100. By virtue of the off-set or short transverse opening 62 (FIG. 2) formed at the end of the slot 56, it may be noted from FIG. 2 that, as the pivot pin member 92 (FIG. 7) moves therein in response to the pivot pin member 86 being positioned in the Park [P] position in the slot 58, the retainer flange 64 and its associated pivot pin member 94 will seek the same point in the slot 54 for the Park [P] position of the retainer flange 68 and its associated pivot pin member 86 in the slot 58 as would result from positioning the pivot pin member 86 in the Neutral [N] position in the slot 58.

As may now be realized from FIGS. 6 and 7, rotation of the member 121 of the lock mechanism 22 via the key 26 (FIG. 1) produces a corresponding movement of the linkage rod 116, (FIG. 7) which, in turn, pivots the plate member 114 about the pivot pin 112. This correspondingly moves the linkage rod 118, causing the plate member 122 to pivot about the pivot pin 124 and forces the pin member 128 toward or away from the axis of the pivot pin 124, depending upon the positioning of the cam slot 126. It is only when the control knob casing 154 is rotated to Park [P] that the opening 131 is aligned with the adjacent end of the pin member 128. The shape of the cam slot 126 is such that the pin member 128 is caused to enter the opening 131 in its Park [P] location only when the key-controlled member 121 is rotated into the Lock [L] position (FIG. 7). The resultant movement of the linkage rod 116 and the plate member 114, when the lock mechanism member 121 is rotated into the Lock [L] position, is such that the brake and steering cables 134 and 142, respectively, which are pivotally secured to the plate member 114 by the pin member 133 are caused to move to lock the steering wheel 14 and the parking brake (not shown). This, of course, as indicated above, would not occur unless the control knob assembly 16 is first rotated to the Park [P] position.

It should be apparent that the invention provides an improved, compact instrument panel-mounted control mechanism wherein manual rotation of a control knob serves, through an associated pulley and belt arrangement, to efficiently move a cable to selectively shift the transmission. It should also be apparent that the control mechanism further includes a lock mechanism and associated linkage means for actuating two additional cables and a linkage rod to respectively lock the steering wheel and parking brake and to permit key removal automatically, provided the control knob has first been rotated into the Park [P] position, and the parking brake is manually applied.

While but one embodiment of the invention has been shown and described, other modifications thereof are possible.

We claim:

1. An actuating mechanism comprising a fixed hub member having an axial opening formed therethrough, a starter switch secured about said hub member and having two spaced sets of contacts mounted in a predetermined circle therein, a shaft rotatably mounted and axially located in said axial opening, rotary knob means secured on an end of said shaft and being manually rotatable into a plurality of predetermined positions including first and second positions, an axial pocket formed in the outer end of said rotary knob means, a starter button having a cylindrical extension formed thereon and slidably mounted in said axial pocket, a longitudinal passage formed through said rotary knob means parallel to said axial pocket and having the axis thereof aligned with said predetermined circle, a spring partially compressed and mounted through said cylindrical extension between said starter button and the bottom of said axial pocket, stop means formed on said cylindrical extension and around said axial pocket for limiting the outward movement of said cylindrical extension in said axial pocket under the force of said spring, and a rod-like member formed on said starter button and slidably mounted through said longitudinal passage and being operable to enter and thereby close one of said respective sets of contacts only when said rotary knob means is positioned in one of said respective first and second positions upon manual depression of said starter button against the force of said spring.

2. For use with an automobile engine and a starter therefor, an instrument panel-mounted engine starting mechanism comprising a fixed hub member having an axial opening formed therethrough, a starter switch secured around said hub member and having two spaced sets of contacts mounted in a predetermined circle therein, a shaft rotatably mounted and axially located in said axial opening, a rotary control knob secured on an end of said shaft and being manually rotatably into a plurality of transmission ratio control positions including Park and Neutral, said rotary control knob including an inner member secured to said shaft, a casing slidably mounted around said inner member, a plurality of stepped circumferential slots formed in the outer periphery of said casing and including said Park and Neutral positions, a fixed pin member extending into said slots, a first spring mounted between retainer means formed on each of said inner member and said casing for urging said casing away from said inner member and into contact at one of said stepped circumferential slots thereof with said fixed pin member in some one of said plurality of ratio control positions, an axial pocket formed in the outer end of said inner member, a starter button assembly slidably mounted in said axial pocket, and a longitudinal passage formed through said inner member parallel to said axial pocket and having the axis thereof in alignment with said predetermined circle of said two sets of contacts, said starter button assembly including a sleeve member formed shorter than the depth of said axial pocket and being slidably mounted in said axial pocket, a button-shaped end portion formed on the outer end of said sleeve member, a second spring partially compressed and mounted through said sleeve member between said end portion and the bottom of said axial pocket, stop means formed on said sleeve member and around said axial pocket for limiting the outward movement of said sleeve member in said axial pocket under the force of said second spring, and a rod-like member formed on said end portion and slidably mounted through said longitudinal passage and being operable to enter and thereby close one of said respective sets of contacts and start said engine only when said casing is rotated into one of said respective Park and Neutral positions against the force of said first spring and upon manual depression of said button-shaped end portion against the force of said second spring.

\* \* \* \* \*